(12) United States Patent
Kumagai et al.

(10) Patent No.: US 11,885,824 B2
(45) Date of Patent: Jan. 30, 2024

(54) AUTOMATIC ANALYZER

(71) Applicant: Hitachi High-Tech Corporation, Tokyo (JP)

(72) Inventors: Takahiro Kumagai, Tokyo (JP); Kazuhiro Noda, Tokyo (JP); Nobuya Fukuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 149 days.

(21) Appl. No.: 17/437,499

(22) PCT Filed: Feb. 4, 2020

(86) PCT No.: PCT/JP2020/004082
§ 371 (c)(1),
(2) Date: Sep. 9, 2021

(87) PCT Pub. No.: WO2020/208914
PCT Pub. Date: Oct. 15, 2020

(65) Prior Publication Data
US 2022/0146543 A1    May 12, 2022

(30) Foreign Application Priority Data
Apr. 8, 2019 (JP) .................................. 2019-073339

(51) Int. Cl.
*G01N 35/10* (2006.01)
*G01N 35/00* (2006.01)

(52) U.S. Cl.
CPC ............... *G01N 35/1002* (2013.01); *G01N 2035/00277* (2013.01); *G01N 2035/00306* (2013.01);
(Continued)

(58) Field of Classification Search
None
See application file for complete search history.

(56) References Cited

U.S. PATENT DOCUMENTS

2016/0109389 A1   4/2016 Suzuki et al.
2019/0094253 A1*  3/2019 Hirama .................. G01N 35/00
(Continued)

FOREIGN PATENT DOCUMENTS

CN    105264362 A    1/2016
EP    3 438 670 A1   2/2019
(Continued)

OTHER PUBLICATIONS

International Search Report PCT/JP2020/004082 dated Apr. 21, 2020.
(Continued)

*Primary Examiner* — P. Kathryn Wright
(74) *Attorney, Agent, or Firm* — MATTINGLY & MALUR, PC

(57) ABSTRACT

An automatic analyzer keeps the inside of a reagent cooler that stores a reagent vessel clean. The automatic analyzer includes: a reagent cooler that stores a reagent vessel containing a reagent to be reacted with a sample at a predetermined temperature. A reagent vessel replacement unit includes an opening configured to put the reagent vessel into and take the regent vessel out of the reagent cooler, wherein the opening is opened and closed to replace the reagent vessel. A positive pressure unit positively pressurizes the inside of the reagent cooler with respect to a periphery of the reagent cooler when the opening is opened.

7 Claims, 10 Drawing Sheets

(52) U.S. Cl.
CPC ............. *G01N 2035/00425* (2013.01); *G01N 2035/00455* (2013.01)

(56) References Cited

U.S. PATENT DOCUMENTS

| | | |
|---|---|---|
| 2019/0204346 A1 | 7/2019 | Ebihara et al. |
| 2019/0204349 A1* | 7/2019 | Ariyoshi .............. G01N 33/491 |

FOREIGN PATENT DOCUMENTS

| | | | |
|---|---|---|---|
| JP | 2005257209 A | | 9/2005 |
| JP | 2009139269 A | * | 6/2009 |
| JP | 2009145291 A | | 7/2009 |
| JP | 2009270857 A | | 11/2009 |
| JP | 2012-233923 A | | 11/2012 |
| JP | 2018146253 A | * | 9/2018 |
| WO | 2017/168993 A1 | | 10/2017 |
| WO | 2018/047544 A1 | | 3/2018 |
| WO | WO-2018047544 A1 | * | 3/2018 ................ B01L 1/04 |
| WO | WO-2023282130 A1 | * | 1/2023 |

OTHER PUBLICATIONS

Chinese Office Action received in corresponding Chinese Application No. 202080025627.6 dated Aug. 17, 2022.
Extended European Search Report received in corresponding European Application No. 20787074.2 dated Apr. 5, 2023.

* cited by examiner

[FIG. 1]
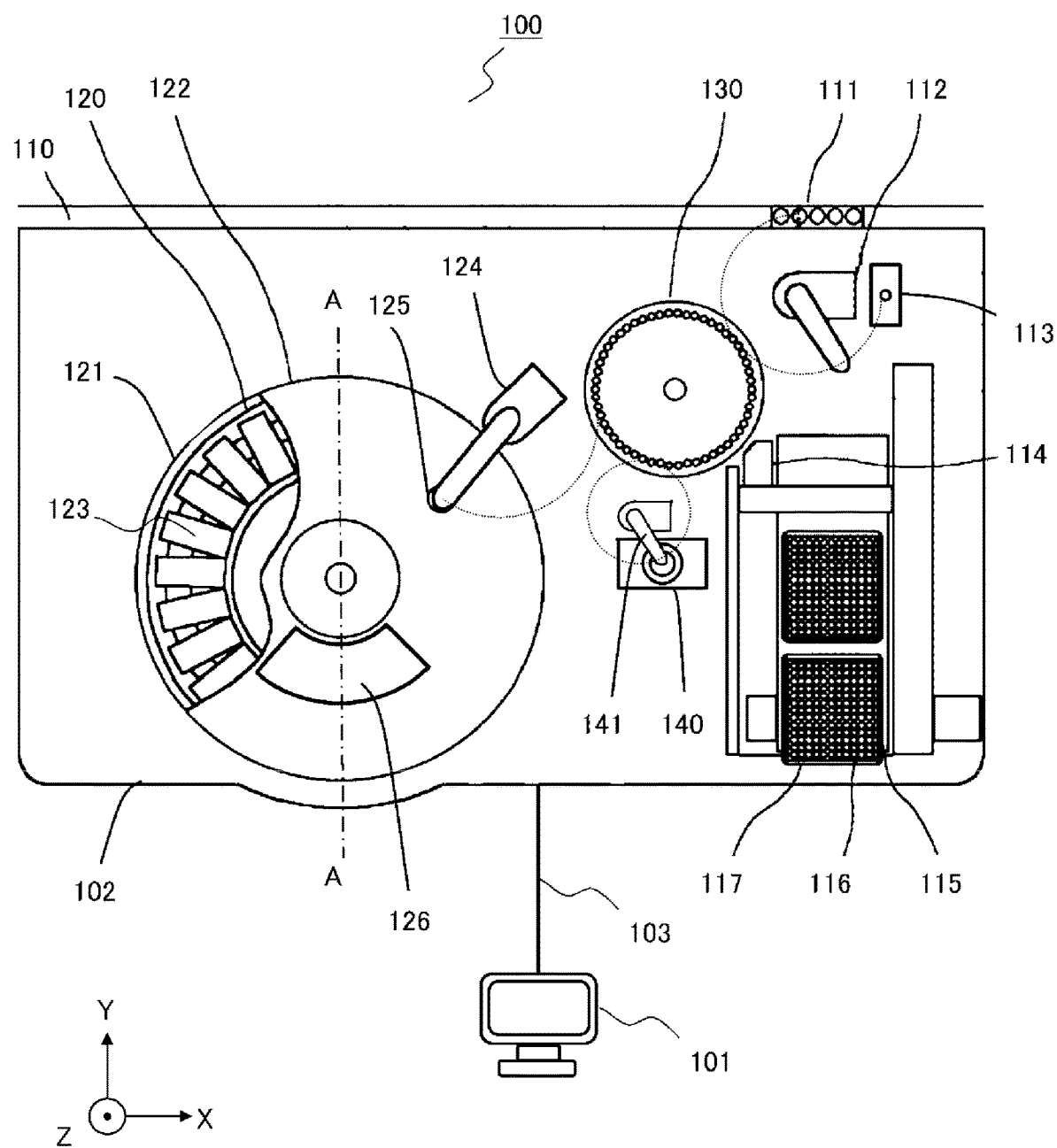

[FIG. 2]
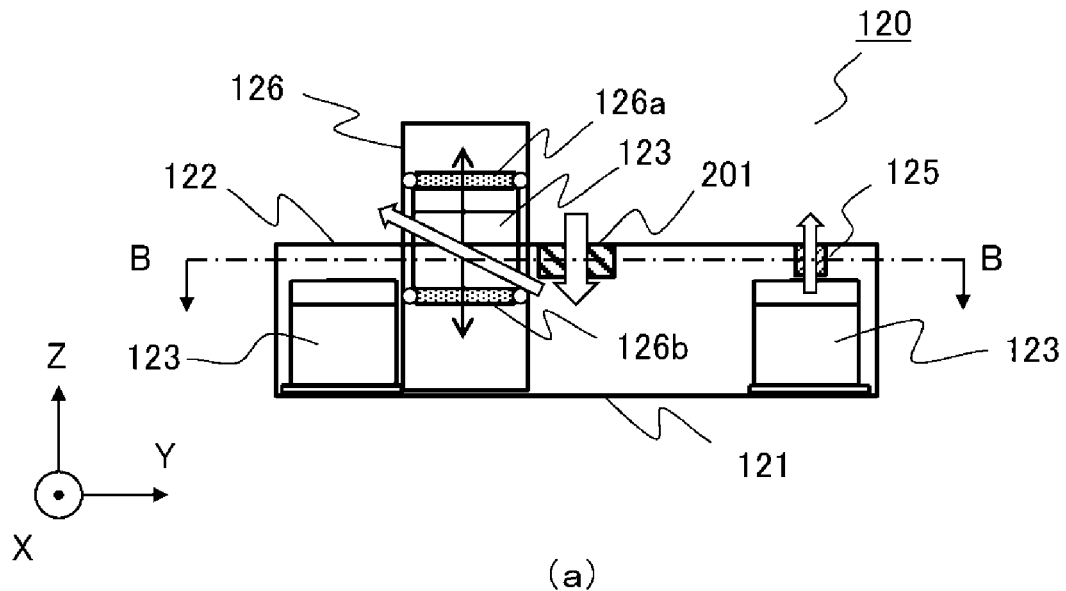
(a)
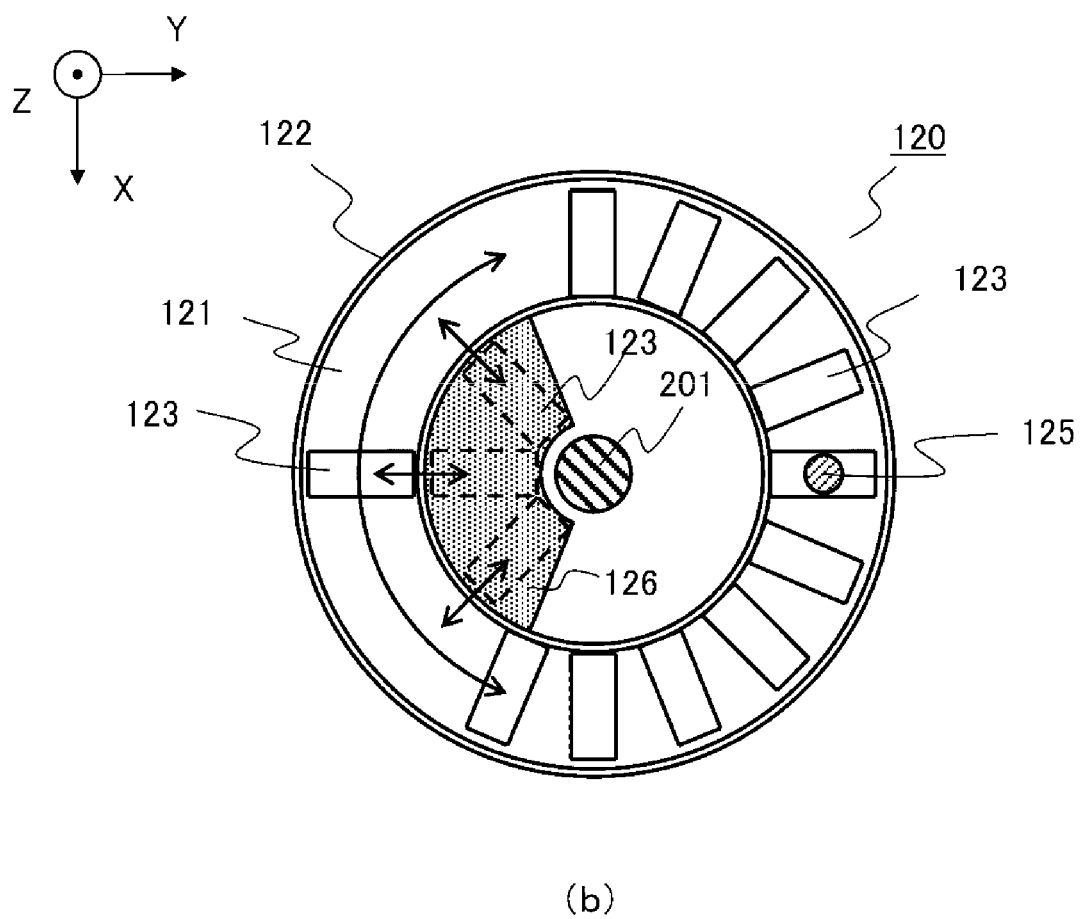
(b)

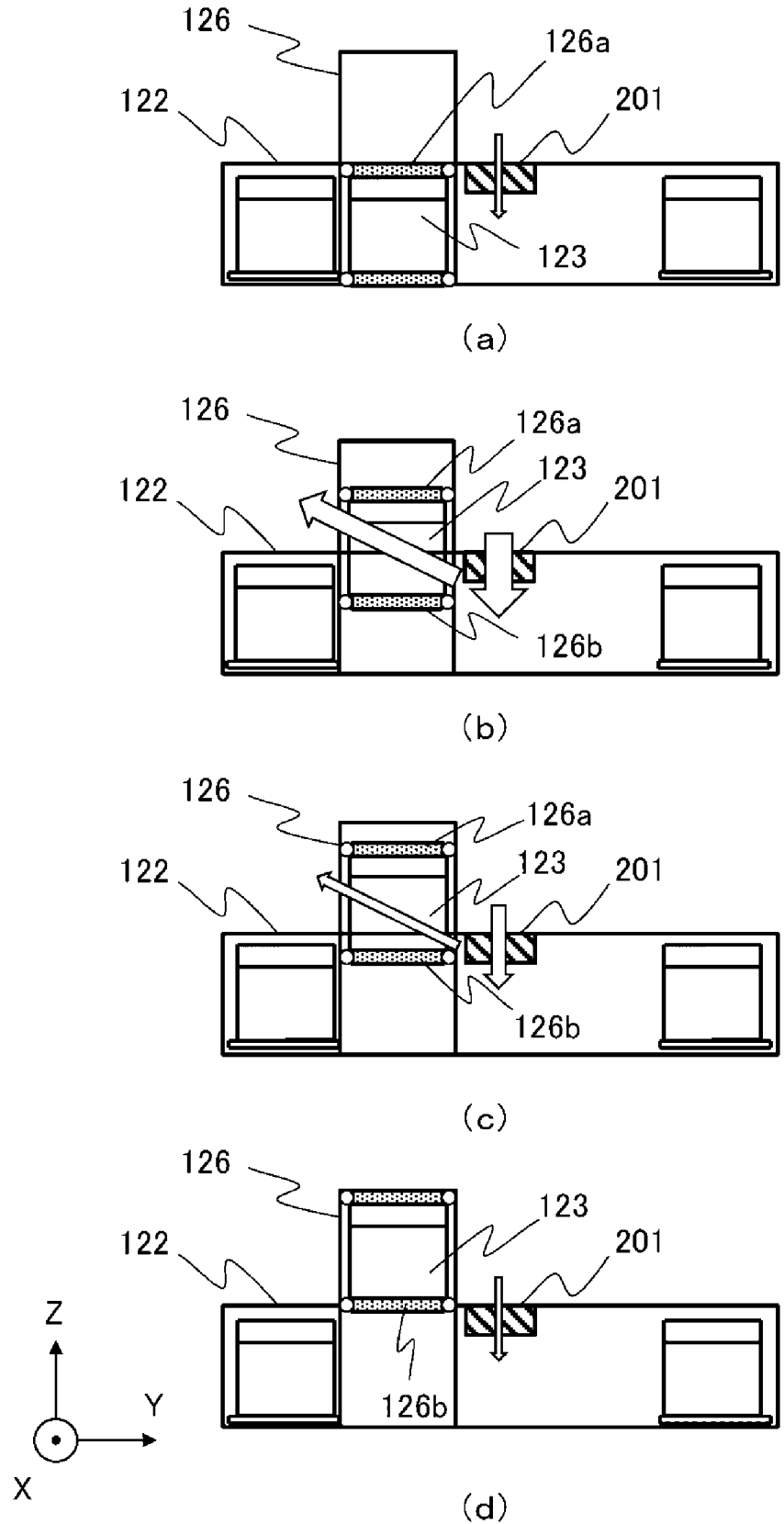
[FIG. 3]

[FIG. 4]
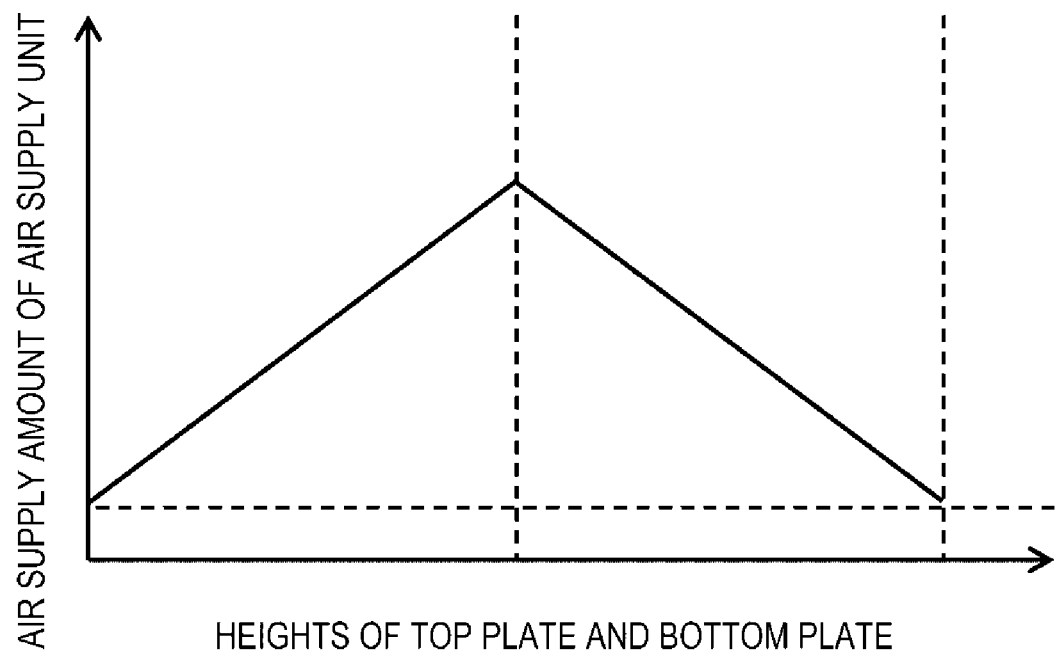

[FIG. 5]
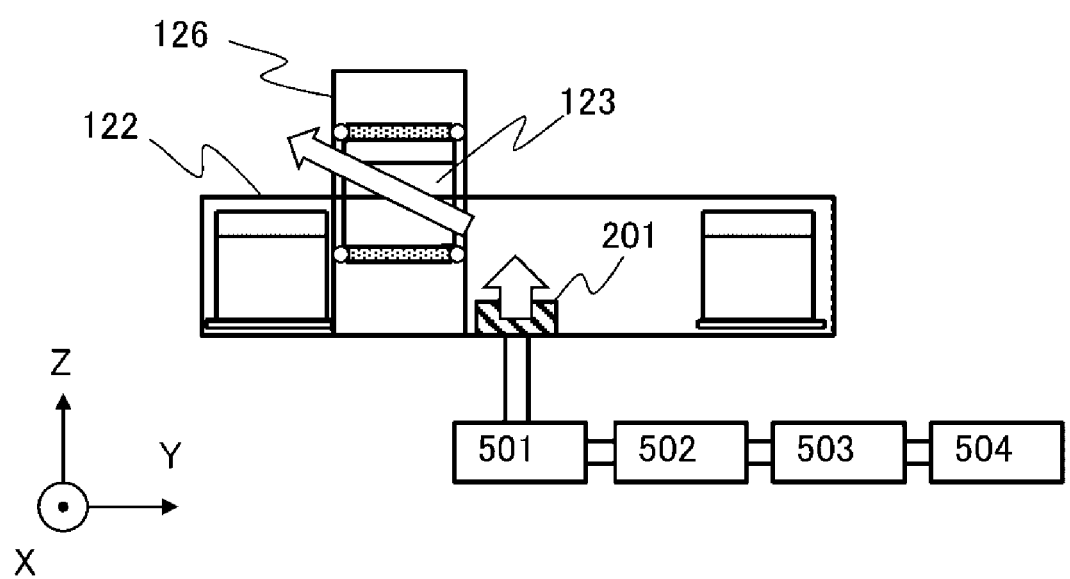

[FIG. 6]
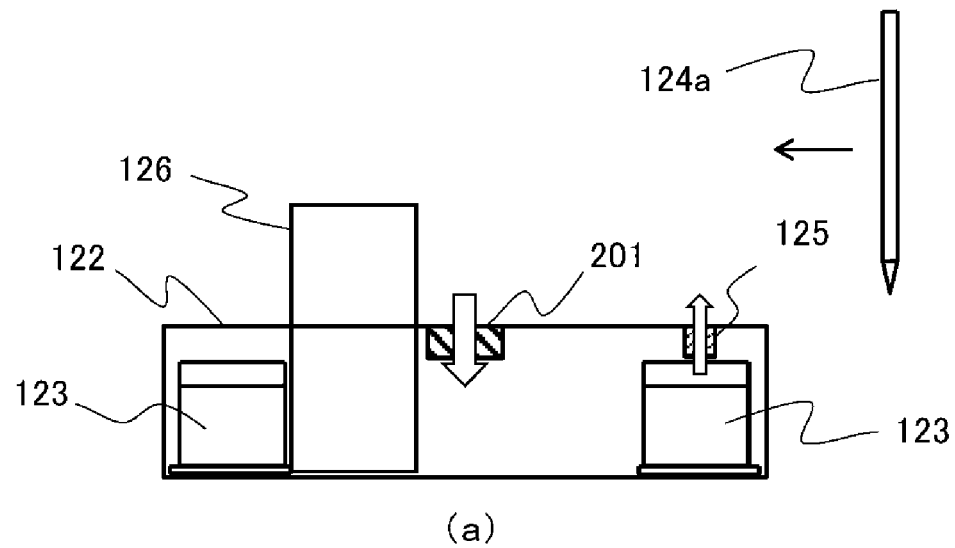
(a)
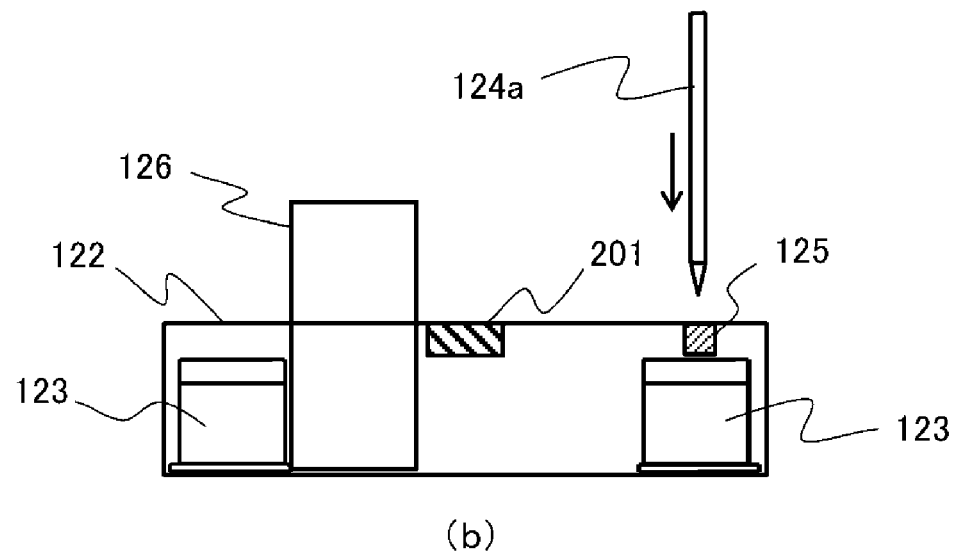
(b)
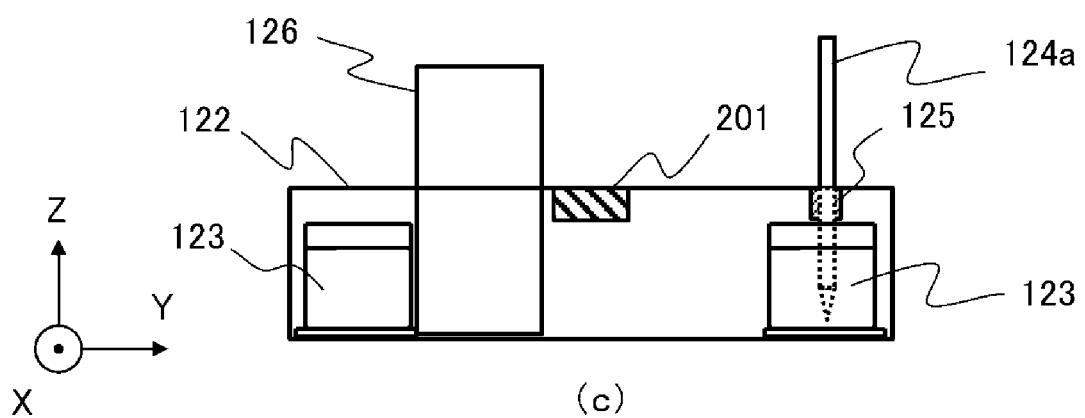
(c)

[FIG. 7]
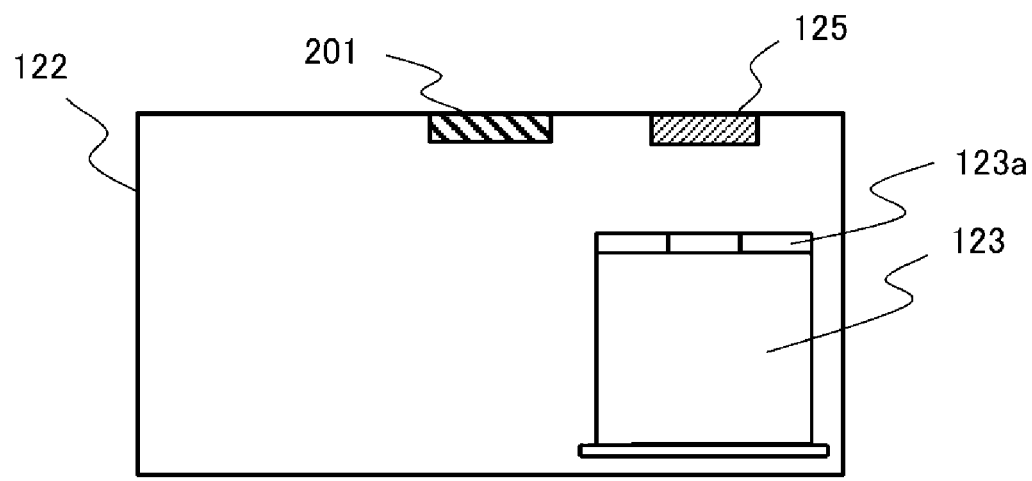
(a)
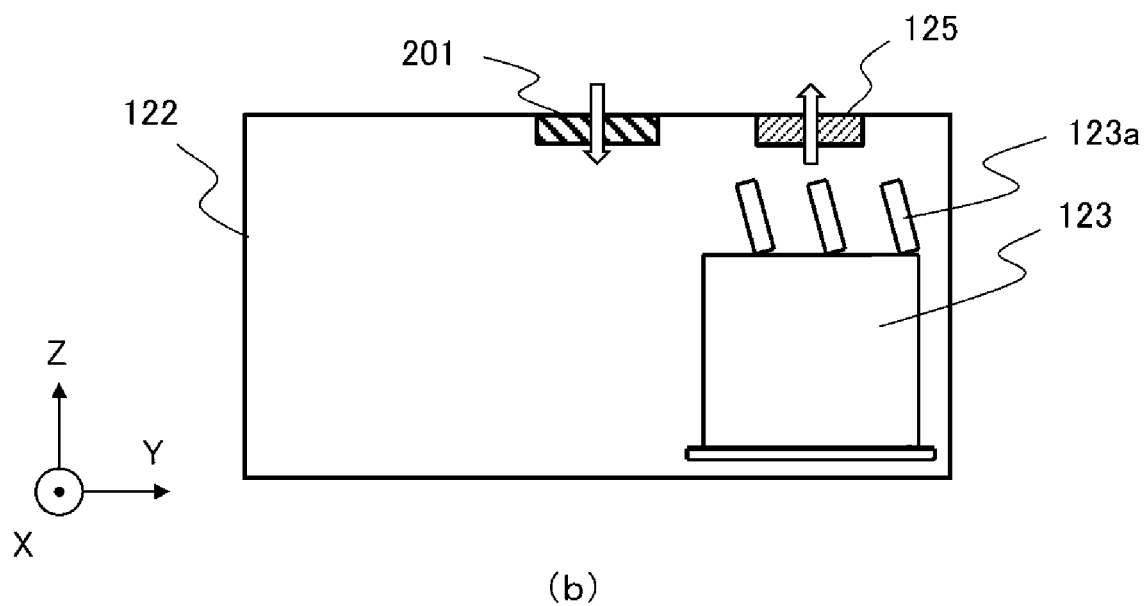
(b)

[FIG. 8]
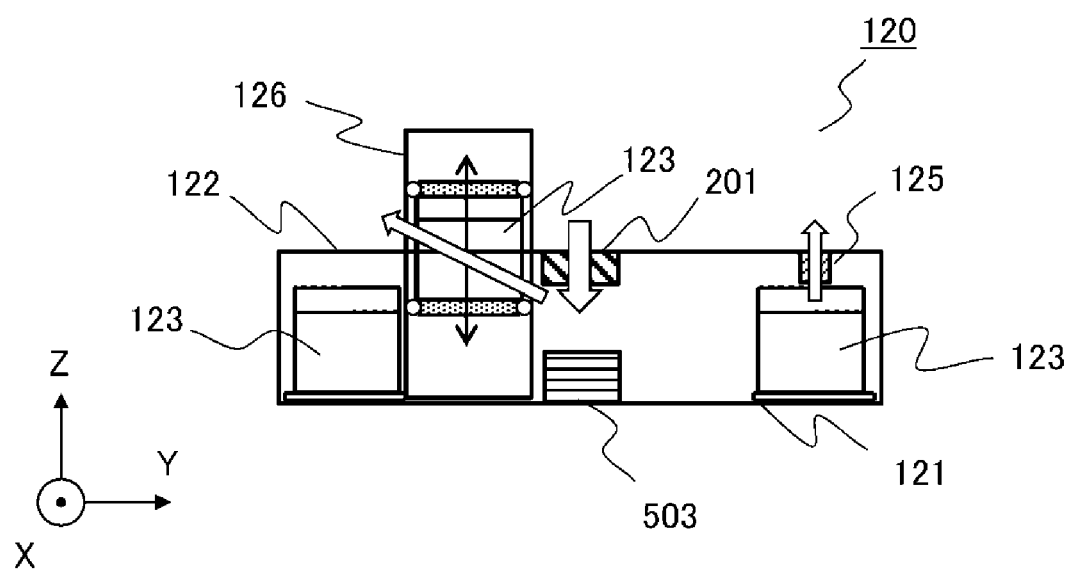

[FIG. 9]
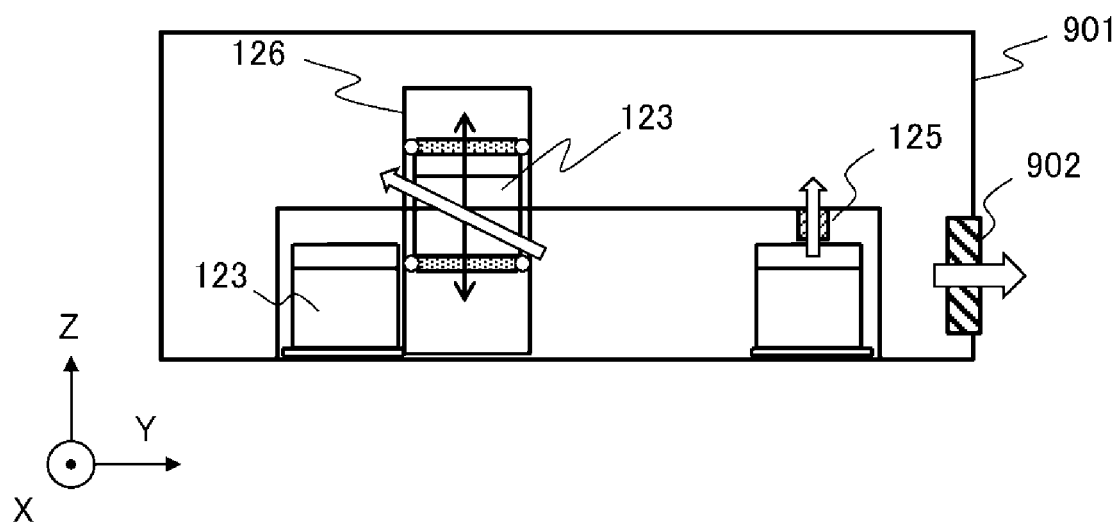

[FIG. 10]
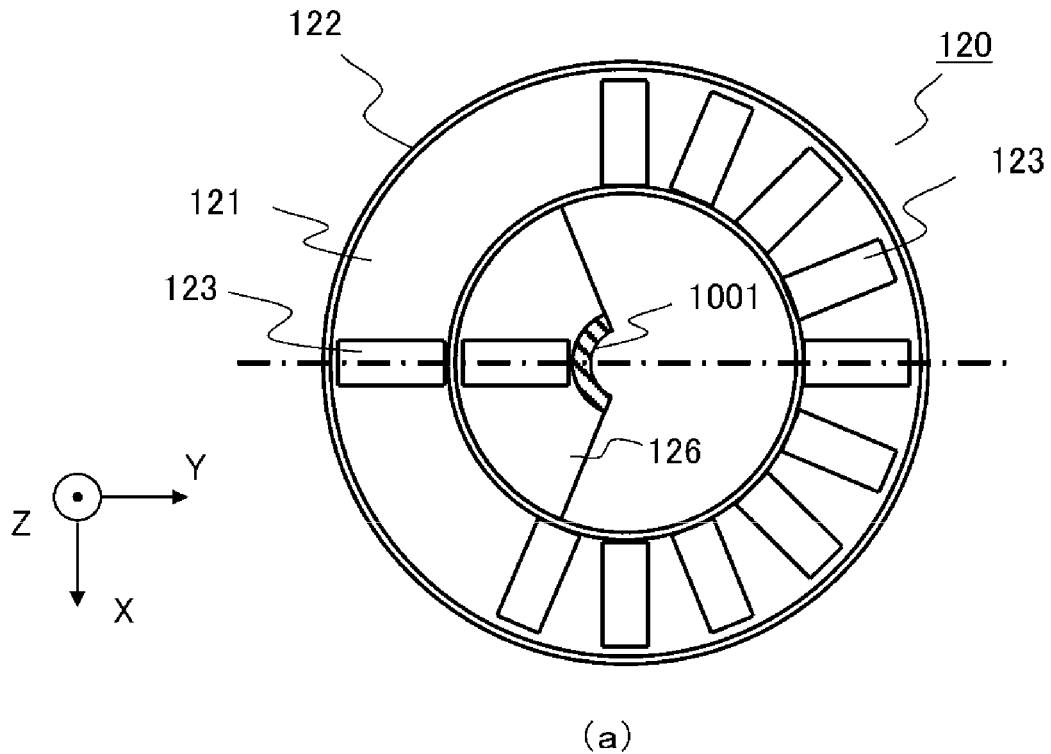
(a)
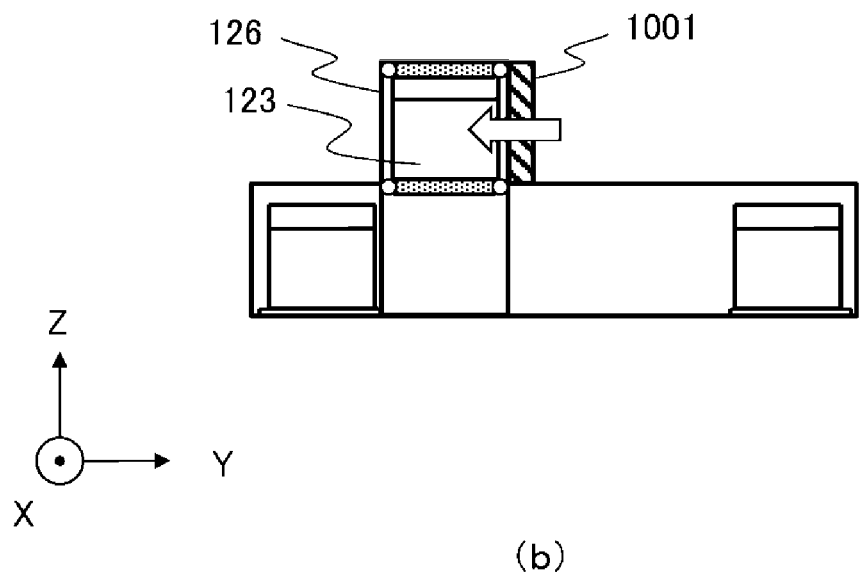
(b)

AUTOMATIC ANALYZER

TECHNICAL FIELD

The present invention relates to an automatic analyzer.

BACKGROUND ART

Using an automatic analyzer in a hospital or an inspection facility, a sample such as blood or urine provided from a subject is analyzed for a clinical test. The analysis in the automatic analyzer is performed with an accuracy of the order of fmol/L, and in order to improve the analysis accuracy, it is important to prevent the mixing of dust or the like in a reaction area which is an area where a reagent for analysis and a sample react with each other.

WO-A-18/047544 (PTL 1) discloses an automatic analyzer in which mixing of dust or the like in a reaction area is prevented by setting the pressure in a reaction area or an area where a consumable such as a dispensing tip supplied to the reaction area is temporarily stored to be higher than that in the surrounding area.

CITATION LIST

Patent Literature

PTL 1: WO-A-18/047544

SUMMARY OF INVENTION

Technical Problem

However, in the automatic analyzer disclosed in PTL 1, inflow or the like of external air into a reagent cooler that stores a reagent vessel containing a reagent for analysis at a low temperature for a long period of time is not considered. The inflow of external air into the reagent cooler causes mixing of dust, germs, or the like in the external air or dew condensation caused by a temperature difference between the inside and the outside of the reagent cooler such that the inside of the reagent cooler may be contaminated. The contamination in the reagent cooler deteriorates a reagent, and in the analysis using the deteriorated reagent, the analysis accuracy of the automatic analyzer may deteriorate.

Therefore, an object of the present invention is to provide an automatic analyzer that keeps inside of a reagent cooler that stores a reagent vessel clean.

Solution to Problem

In order to achieve the object, according to the present invention, there is provided an automatic analyzer that analyzes a sample, the automatic analyzer including: a reagent cooler that stores a reagent vessel containing a reagent to be reacted with a sample at a predetermined temperature; a reagent vessel replacement unit that includes an opening configured to put the reagent vessel into and take the regent vessel out of the reagent cooler, in which the opening is opened and closed to replace the reagent vessel; and a positive pressure unit that positively pressurizes inside of the reagent cooler with respect to a periphery of the reagent cooler when the opening is opened.

In order to achieve the object, according to the present invention, there is provided an automatic analyzer that analyzes a sample, the automatic analyzer including: a reagent cooler that stores a reagent vessel containing a reagent to be reacted with a sample at a predetermined temperature; a reagent vessel replacement unit that includes an opening configured to put the reagent vessel into and take the regent vessel out of the reagent cooler, in which the opening is opened and closed to replace the reagent vessel; and a removal unit that is adjacent to the reagent vessel replacement unit and removes dust or germs adhering to the reagent vessel.

Advantageous Effects of Invention

According to the present invention, an automatic analyzer that keeps inside of a reagent cooler that stores a reagent vessel clean can be provided.

BRIEF DESCRIPTION OF DRAWINGS

FIG. 1 is a view showing an example of an overall configuration of an automatic analyzer according to a first embodiment.

FIGS. 2(a) and 2(b) are views showing an example of a structure of a reagent cooler according to the first embodiment.

FIGS. 3(a) to 3(d) are views showing an example of operation of a reagent cooler according to a second embodiment.

FIG. 4 is a diagram supplementarily showing the example of the operation of the reagent cooler according to the second embodiment.

FIG. 5 is a view showing an example of a structure of a reagent cooler according to a third embodiment.

FIGS. 6(a) to 6(c) are views showing an example of operation of a reagent cooler according to a fourth embodiment.

FIGS. 7(a) and 7(b) are views showing an example of operation of a reagent cooler according to a fifth embodiment.

FIG. 8 is a view showing an example of a structure of a reagent cooler according to a sixth embodiment.

FIG. 9 is a view showing an example of a structure of a reagent cooler according to a seventh embodiment.

FIGS. 10 (a) and 10 (b) are views showing an example of a structure of a reagent cooler according to an eighth embodiment.

DESCRIPTION OF EMBODIMENTS

First Embodiment

Hereinafter, an automatic analyzer 100 according to an embodiment will be described with reference to the drawings. The automatic analyzer 100 is a device in which a sample such as blood or urine provided from a subject is analyzed for a clinical test.

The automatic analyzer 100 according to the embodiment will be described using FIG. 1. The automatic analyzer 100 is configured such that a control unit 101 and an analysis unit 102 are connected through a communication line 103. The control unit 101 is a device that controls the respective units of the analysis unit 102 and is, for example, a computer. An operator inputs analysis conditions or the like from an input unit such as a keyboard, a mouse, a touch panel, or the like in the control unit 101, and checks the analysis result using an output unit such as a liquid crystal display or a touch panel.

The analysis unit 102 is a device that analyzes a sample by measuring light emission or discoloration caused by a reaction of a reagent for analysis and the sample, and includes a sample transport path 110, a reagent cooler 120, an incubator 130, and a reaction liquid measurement unit 140. Hereinafter, the respective units will be described.

The sample transport path 110 is a device that transports a sample vessel 111 containing a sample such as blood or urine to the vicinity of a sample dispensing unit 112. The sample dispensing unit 112 dispenses the sample by aspirating the sample from the transported sample vessel 111 and discharging the sample into a reaction vessel 117 arranged on the incubator 130. A dispensing tip 116 that is transported from a loading rack 115 to a dispensing tip detachment and attachment unit 113 by a transport unit 114 is attached to the sample dispensing unit 112. In order to prevent contamination during the dispensing of the sample, the dispensing tip 116 is replaced whenever the dispensing is performed.

The reagent cooler 120 is a device that stores reagent vessels 123 containing a reagent for analysis at a low temperature for a long period of time, and includes a reagent disk 121 and a reagent jacket 122. The internal temperature of the reagent cooler 120 is maintained, for example, at about 5 to 10 degrees. The reagent vessel 123 is loaded on the reagent disk 121, and the reagent disk 121 rotates around a Z-axis as the rotation axis to move the reagent vessel 123 to a predetermined position, for example, to the vicinity of a reagent dispensing unit 124. The reagent jacket 122 is a lid that covers the reagent disk 121, and is standstill even when the reagent disk 121 rotates. In FIG. 1, a part of the reagent jacket 122 is shown in a perspective view to understand the arrangement of the reagent vessels 123 loaded on the reagent disk 121. In the reagent jacket 122, a dispensing hole 125 that is a hole used when a reagent is dispensed by the reagent dispensing unit 124 or a reagent vessel replacement unit 126 where the reagent vessel 123 is replaced is provided. The reagent dispensing unit 124 dispenses a reagent by aspirating the reagent from the reagent vessel 123 through the dispensing hole 125 and discharging the reagent into the reaction vessel 117 that is arranged on the incubator 130 and into which the sample is dispensed. The reagent cooler 120 will be described below using FIG. 2.

The incubator 130 is a device that holds a mixed liquid of the sample dispensed by the sample dispensing unit 112 and the reagent dispensed by the reagent dispensing unit 124 at a given temperature. Before dispensing the sample or the reagent, the reaction vessel 117 is transported from the loading rack 115 to the incubator 130 by the transport unit 114. By holding the mixed liquid in the reaction vessel 117 at the given temperature, a reaction liquid is formed.

The reaction liquid measurement unit 140 analyzes the sample by measuring discoloration or light emission of the reaction liquid that is dispensed by a reaction liquid dispensing unit 141 from the reaction vessel 117 arranged on the incubator 130. The analysis result in the reaction liquid measurement unit 140 is displayed by an output unit such as a liquid crystal display or a touch panel in the control unit 101. The reaction vessel 117 into which the reaction liquid is dispensed is removed by being transported from the incubator 130 to the loading rack 115 by the transport unit 114.

A structure of the reagent cooler 120 according to the embodiment will be described using FIG. 2. FIG. 2(a) is a cross-sectional view taken along line A-A of FIG. 1. FIG. 2(b) is a B-B arrow view of FIG. 2(a). The reagent jacket 122 of the reagent cooler 120 according to the embodiment includes a reagent vessel replacement unit 126 and an air supply unit 201.

The reagent vessel replacement unit 126 has a structure where a shape obtained by cutting out a part from a circular ring extends in a Z-axis direction, and has a height that is two times or more of the height of the reagent vessel 123. In addition, in the reagent vessel replacement unit 126, an opening configured to put the reagent vessel 123 into and take the regent vessel out of the reagent cooler is provided in a radial direction of the reagent jacket 122. Further, in the reagent vessel replacement unit 126, a top plate 126a and a bottom plate 126b that holds the reagent vessel 123 in the vertical direction and moves in the Z direction is provided.

When the top plate 126a and the bottom plate 126b are positioned on the uppermost stage of the reagent vessel replacement unit 126, the reagent vessel 123 is put into and taken out of the reagent vessel replacement unit 126. In addition, when the top plate 126a and the bottom plate 126b are positioned on the lowermost stage, the reagent vessel 123 moves between the reagent vessel replacement unit 126 and the reagent disk 121. That is, the reagent vessel 123 is put into and taken out of the reagent cooler 120 through the reagent vessel replacement unit 126. In FIGS. 2(a) and 2(b), the movement of the reagent vessel 123 is indicated by a double-headed arrow. The movement of the reagent vessel 123 is performed by the control unit 101 controlling a transport mechanism (not shown).

In a marginal region of the top plate 126a and the bottom plate 126b, an airtight holder formed of rubber may be provided. By providing the airtight holder, when the top plate 126a and the bottom plate 126b are positioned on the uppermost stage or the lowermost stage of the reagent vessel replacement unit 126, the top plate 126a or the bottom plate 126b functions as a lid. That is, the bottom plate 126b blocks the reagent cooler 120 from the periphery on the uppermost stage, and the top plate 126a blocks the reagent cooler 120 from the periphery on the lowermost stage.

The air supply unit 201 is a device that takes air into the reagent cooler 120 and is, for example, a blower fan. By the air supply unit 201 taking air into the reagent cooler 120, the inside of the reagent cooler 120 is positively pressurized with respect to the periphery of the reagent cooler 120 such that the inflow of external air from the periphery of the reagent cooler 120 can be prevented. In particular, when the top plate 126a and the bottom plate 126b are positioned between the uppermost stage and the lowermost stage of the reagent vessel replacement unit 126, the opening of the reagent vessel replacement unit 126 functions as an inlet of external air, and the inside of the reagent cooler 120 can be kept clean without allowing the inflow of external air due to the positive pressurization of the reagent cooler 120. In addition, the dispensing hole 125 also functions as an inlet of external air, and the inflow of external air can be prevented due to the positive pressurization of the reagent cooler 120. In FIG. 2(a), the flow of air is indicated by a white arrow. The dispensing hole 125 may be configured with a valve rubber or the like that allows the passage of a nozzle of the reagent dispensing unit 124 but prevents the inflow of external air.

As described above, in the embodiment, the inside of the reagent cooler 120 is positively pressurized with respect to the periphery of reagent cooler 120, and the inflow of external air from the periphery of the reagent cooler 120 can be prevented. Therefore, the inside of the reagent cooler 120 can be kept clean. In addition, by keeping the inside of the reagent cooler 120 clean, contamination in the reagent cooler 120 and deterioration of the reagent can be prevented. Therefore, the analysis accuracy of the automatic analyzer 100 can be maintained.

Second Embodiment

In the first embodiment, the intake of air into the reagent cooler 120 by the air supply unit 201 is described. When the top plate 126a and the bottom plate 126b of the reagent vessel replacement unit 126 move in the Z direction, the opening degree of the opening of the reagent vessel replacement unit 126 that functions as the inlet of external air changes depending on the heights of the top plate 126a and the bottom plate 126b. When the opening is largely opened, external air is more likely to flow into the reagent cooler 120. Therefore, in the embodiment, a configuration in which an air supply amount that is the amount of air taken by the air supply unit 201 is controlled in accordance with the heights of the top plate 126a and the bottom plate 126b will be described. Since the overall configuration of the automatic analyzer 100 is the same as that of the first embodiment, the description thereof will not be repeated. In addition, since the structure of the reagent cooler 120 is the same as that of the first embodiment, only portions added to the first embodiment will be described supplementarily.

An operation of the reagent cooler 120 according to the embodiment will be described using FIG. 3. FIGS. 3(a) to 3(d) show the process of moving up the top plate 126a and the bottom plate 126b from the lowermost stage to the uppermost stage to take the reagent vessel 123 out of the reagent cooler 120, in which a white arrow indicates the arrow of air, and the thickness of the white arrow indicates the flow rate.

As shown in FIG. 3(a), when the top plate 126a and the bottom plate 126b are positioned on the lowermost stage, the opening of the reagent vessel replacement unit 126 is closed by the top plate 126a. Therefore, the air supply amount of the air supply unit 201 is set to a minimum value. The minimum value of the air supply amount is set based on a gap between the reagent jacket 122 and the reagent disk 121, the size of the dispensing hole 125, and the like. For example, when airtightness between the reagent jacket 122 and the reagent disk 121 is maintained and a valve rubber or the like is used as the dispensing hole 125, the minimum value of the air supply amount may be set to zero.

As shown in FIG. 3 (b), when the top plate 126a and the bottom plate 126b are moved up to a middle region, the distance from the top plate 126a to an upper surface of the reagent jacket 122 is equal to the distance from the upper surface of the reagent jacket 122 to the bottom plate 126b. That is, an inlet from the periphery to the reagent vessel replacement unit 126 has the same area as an inlet from the reagent vessel replacement unit 126 to the reagent disk 121, and the opening degree of the opening of the reagent vessel replacement unit 126 is the maximum. Therefore, the air supply amount of the air supply unit 201 is set to be a maximum value. The maximum value of the air supply amount is set such that the inflow of external air into the reagent cooler 120 is prevented even when the opening degree of the opening of the reagent vessel replacement unit 126 is the maximum.

As shown in FIG. 3(c), when the top plate 126a and the bottom plate 126b are further moved up from the middle region, the distance from the top plate 126a to the upper surface of the reagent jacket 122 increases, but the distance from the upper surface of the reagent jacket 122 to the bottom plate 126b decreases. That is, the size of the inlet from the periphery to the reagent vessel replacement unit 126 increases, but the size of the inlet from the reagent vessel replacement unit 126 to the reagent disk 121 decreases. Therefore, the opening degree of the opening of the reagent vessel replacement unit 126 is lower than that of FIG. 3(b). Therefore, the air supply amount of the air supply unit 201 is set to a value less than that of FIG. 3(b).

As shown in FIG. 3(d), when the top plate 126a and the bottom plate 126b are positioned on the uppermost stage, the opening of the reagent vessel replacement unit 126 is closed by the bottom plate 126b. Therefore, as in FIG. 3(a), the air supply amount of the air supply unit 201 is set to the minimum value.

The operation of the reagent cooler 120 according to the embodiment will be described supplementarily using FIG. 4. FIG. 4 is a diagram showing a relationship between the air supply amount of the air supply unit 201 and the heights of the top plate 126a and the bottom plate 126b. As described above using FIG. 3, when the top plate 126a and the bottom plate 126b are positioned on the uppermost stage or the lowermost stage, the air supply amount is set to the minimum value, and when the top plate 126a and the bottom plate 126b are positioned in the middle region, the air supply amount is set to the maximum value. In addition, when the top plate 126a and the bottom plate 126b are positioned between the lowermost stage and the middle region, the air supply amount increases in accordance with the height, and when the top plate 126a and the bottom plate 126b are positioned between the middle region and the uppermost stage, the air supply amount decreases in accordance with the height. That is, irrespective of whether the top plate 126a and the bottom plate 126b move up or down, the air supply amount is set in accordance with the heights of the top plate 126a and the bottom plate 126b. The heights of the top plate 126a and the bottom plate 126b are measured by a position sensor (not shown) and transmitted to the control unit 101, and the control unit 101 controls the air supply amount of the air supply unit 201 in accordance with the transmitted heights.

As described above, in the embodiment, the air supply amount of the air supply unit 201 that positively pressurizes the inside of the reagent cooler 120 is controlled in accordance with the heights of the top plate 126a and the bottom plate 126b. Therefore, the inflow of external air into the reagent cooler 120 can be prevented, and the power of the air supply unit 201 can be saved. By preventing the inflow of external air, the inside of the reagent cooler 120 can be kept clean, and the analysis accuracy of the automatic analyzer 100 can be maintained accordingly as in the first embodiment.

Third Embodiment

In the first embodiment, the intake of air into the reagent cooler 120 by the air supply unit 201 is described. It is preferable that the air taken into the reagent cooler 120 is clean without being condensed. Therefore, in the embodiment, a configuration in which at least one of dehumidification, sterilization, dust removal, and temperature adjustment is performed on the air taken in by the air supply unit 201 will be described. Since the overall configuration of the automatic analyzer 100 is the same as that of the first embodiment, the description thereof will not be repeated.

A structure of the reagent cooler 120 according to the embodiment will be described using FIG. 5. The reagent cooler 120 according to the embodiment includes not only the air supply unit 201 but also at least one of a temperature control part 501, a dehumidification unit 502, a sterilization unit 503, and a filter 504 that is provided in the front stage of the air supply unit 201. FIG. 5 shows a configuration in which the temperature control part 501, the dehumidification unit 502, the sterilization unit 503, and the filter 504 are connected in series.

The temperature control part 501 is a device that adjusts the temperature of the air taken in from the air supply unit 201 and is, for example, a heater or a water-cooled tube. In order to prevent the air taken in from the air supply unit 201 from being condensed, it is preferable that the temperature of the air is adjusted to be equal to the temperature in the reagent cooler 120. The temperature in the reagent cooler 120 is measured by a thermometer (not shown) or the like and transmitted to the control unit 101, and the control unit 101 may control the operation of the temperature control part 501 in accordance with the transmitted temperature.

The dehumidification unit 502 is a device that adjusts the humidity of the air taken in from the air supply unit 201 and is, for example, a dehumidifier including a compressor or a vessel where a dehumidifying material such as silica gel is sealed. In order to prevent the air taken in from the air supply unit 201 from being condensed, it is preferable that water vapor in the air is reduced as much as possible. The humidity in the reagent cooler 120 is measured by a hygrometer (not shown) or the like and transmitted to the control unit 101, and the control unit 101 may control the operation of the dehumidification unit 502 in accordance with the transmitted humidity.

The sterilization unit 503 is a device that sterilizes the air taken in from the air supply unit 201 and is, for example, a device that emits ultraviolet light or a device that produces ozone by a photocatalyst. In order to keep the air taken in from the air supply unit 201 clean, it is preferable to reduce germs or mold in the air. The floating amount of germs or mold in the reagent cooler 120 is measured by a sensor (not shown) or the like and transmitted to the control unit 101, and the control unit 101 may control the operation of the sterilization unit 503 in accordance with the transmitted value. In addition, the control unit 101 may display the measured value of the floating amount or may sound an alarm in accordance with the measured value of the floating amount.

The filter 504 collects dust, germs, or the like in the air taken in from the air supply unit 201 and is, for example, a gauze or nonwoven fabric. In order to keep the air taken in from the air supply unit 201 clean, it is preferable to reduce dust or germs in the air.

As described above, in the embodiment, at least one of the temperature control part 501, the dehumidification unit 502, the sterilization unit 503, and the filter 504 is provided in the front stage of the air supply unit 201. In the embodiment, in order to positively pressurize the inside of the reagent cooler 120, the dew condensation of the air taken in by the air supply unit 201 can be suppressed, and the inside of the reagent cooler 120 can be kept clean. Therefore, the inflow of external air into the reagent cooler 120 can be prevented, and therefore, the inside of the reagent cooler 120 can be kept cleaner. By preventing the inflow of external air, the inside of the reagent cooler 120 can be kept clean, and the analysis accuracy of the automatic analyzer 100 can be maintained accordingly as in the first embodiment.

Fourth Embodiment

In the first embodiment, the intake of air into the reagent cooler 120 by the air supply unit 201 is described. The air taken in by the air supply unit 201 may affect the dispensing of a reagent. Therefore, in the embodiment, a configuration in which the air supply unit 201 is controlled in accordance with the operation of the reagent dispensing unit 124 will be described. Since the overall configuration of the automatic analyzer 100 is the same as that of the first embodiment, the description thereof will not be repeated. In addition, since the structure of the reagent cooler 120 is the same as that of the first embodiment, only portions added to the first embodiment will be described supplementarily.

An operation of the reagent cooler 120 according to the embodiment will be described using FIG. 6. FIGS. 6(*a*) to 6(*c*) show the process in which a dispensing nozzle 124*a* of the reagent dispensing unit 124 moves to dispense a reagent from the reagent vessel 123, in which a white arrow indicates the flow of air.

As shown in FIG. 6(*a*), while the dispensing nozzle 124*a* moves in the horizontal direction, the air supply unit 201 takes air in to positively pressurize the inside of the reagent cooler 120. By positively pressurizing the reagent cooler 120, the air in the reagent cooler 120 is exhausted from the dispensing hole 125. Therefore, the inflow of external air from the dispensing hole 125 is prevented.

As shown in FIG. 6(*b*), when the dispensing nozzle 124*a* is arranged above the dispensing hole 125, the intake of air by the air supply unit 201 is stopped. Next, the dispensing nozzle 124*a* moves down and is inserted into the dispensing hole 125. The position of the dispensing nozzle 124*a* is measured by being detected by a position sensor or the like detecting a detection plate provided in the reagent dispensing unit 124, and the control unit 101 controls the operation of the air supply unit 201 in accordance with the measured position of the dispensing nozzle 124*a*. Alternatively, the control unit 101 may control the operation of the air supply unit 201 based on a previously planned operation timing.

As shown in FIG. 6(*c*), while the dispensing nozzle 124*a* is inserted into the reagent vessel 123 through the dispensing hole 125, the intake of air by the air supply unit 201 is stopped. By stopping the air supply unit 201, the flow of air in the reagent cooler 120 is suppressed, and deterioration in the dispensing accuracy of the reagent can be prevented.

As described above, in the embodiment, the air supply unit 201 is controlled in accordance with the operation of the reagent dispensing unit 124. Therefore, the inflow of external air into the reagent cooler 120 can be prevented, and an adverse effect on the dispensing accuracy of the reagent can be prevented. By preventing the inflow of external air, the inside of the reagent cooler 120 can be kept clean, and the analysis accuracy of the automatic analyzer 100 can be maintained accordingly as in the first embodiment.

Fifth Embodiment

In the first embodiment, the intake of air into the reagent cooler 120 by the air supply unit 201 is described. When dust or the like is mixed in the reagent cooler 120 in a state where the lid of the reagent vessel 123 is opened, the reagent may deteriorate. Therefore, in the embodiment, a configuration in which the operation of the air supply unit 201 is controlled in accordance with opening and closing of the lid of the reagent vessel 123 is described. Since the overall configuration of the automatic analyzer 100 is the same as that of the first embodiment, the description thereof will not be repeated. In addition, since the structure of the reagent cooler 120 is the same as that of the first embodiment, only portions added to the first embodiment will be described supplementarily.

An operation of the reagent cooler 120 according to the embodiment will be described using FIG. 7. FIG. 7(*a*) shows a state where a lid 123*a* of the reagent vessel 123 is closed and FIG. 7(b) shows a state where the lid 123a is opened, in which a white arrow indicates the flow of air.

As shown in FIG. 7 (a), while the lid 123a is closed, the operation of the air supply unit 201 is stopped. The opening and closing of the lid 123a are detected by a sensor (not shown) and transmitted to the control unit 101, and the control unit 101 controls the operation of the air supply unit 201 in accordance with the opening and closing of the lid 123a. Alternatively, the control unit 101 may control the operation of the air supply unit 201 based on a previously planned operation timing. While the lid 123a is closed, dust or the like is prevented from being mixed in the reagent vessel 123.

As shown in FIG. 7 (b), while the lid 123a is opened, the air supply unit 201 is operated. Due to the operation of the air supply unit 201, air is taken into the reagent cooler 120, and air is exhausted from the dispensing hole 125. Therefore, the inflow of external air from the dispensing hole 125 is prevented.

As described above, in the embodiment, the air supply unit 201 is controlled in accordance with the opening and closing of the lid 123a of the reagent vessel 123. Therefore, the mixing of dust or the like in the reagent vessel 123 can be prevented, and deterioration in the reagent can be prevented. By preventing the deterioration in the reagent, the analysis accuracy of the automatic analyzer 100 can be maintained.

Sixth Embodiment

In the first embodiment, the intake of air into the reagent cooler 120 by the air supply unit 201 is described. When germs are mixed in the reagent cooler 120, the reagent may deteriorate. Therefore, in the embodiment, a configuration in which the inside of the reagent cooler 120 is sterilized will be described. Since the overall configuration of the automatic analyzer 100 is the same as that of the first embodiment, the description thereof will not be repeated.

A structure of the reagent cooler 120 according to the embodiment will be described using FIG. 8. The reagent cooler 120 according to the embodiment includes the sterilization unit 503. As in the third embodiment, the sterilization unit 503 is a device that sterilizes the air taken in from the air supply unit 201 and is, for example, a device that emits ultraviolet light or a device that produces ozone by a photocatalyst. The sterilization unit 503 may operate in accordance with the floating amount of germs or mold in the reagent cooler 120 or may operate on a regular basis. During the operation of the sterilization unit 503, in order to prevent the deterioration of the reagent caused by ultraviolet light or ozone, it is desirable that the lid 123a of the reagent vessel 123 is closed.

When the sterilization unit 503 is a device that emits ultraviolet light, the sterilization unit 503 is arranged on the reagent disk 121, and the sterilization unit 503 may operate together with the rotation of the reagent disk 121. By operating the sterilization unit 503 together with the rotation of the reagent disk 121, ultraviolet light is emitted in a wide range, and thus the effect of sterilization can be improved.

When the sterilization unit 503 is a device that produces ozone, the sterilization unit 503 is arranged outside the reagent cooler 120, and an ozone introduction path that introduces ozone may be provided between the sterilization unit 503 and the reagent cooler 120.

As described above, in the embodiment, in order to positively pressurize the inside of the reagent cooler 120, the air taken in by the air supply unit 201 is sterilized. Therefore, the inflow of external air into the reagent cooler 120 can be prevented, and therefore, the inside of the reagent cooler 120 can be kept cleaner. By preventing the inflow of external air, the inside of the reagent cooler 120 can be kept clean, and the analysis accuracy of the automatic analyzer 100 can be maintained accordingly as in the first embodiment.

Seventh Embodiment

In the first embodiment, the configuration in which the air supply unit 201 takes air in to positively pressurize the inside of the reagent cooler 120 is described. The positive pressurization of the reagent cooler 120 is not limited only to the intake of air by the air supply unit 201. In the embodiment, a configuration in which the inside of the reagent cooler 120 is positively pressurized with respect to the periphery of the reagent cooler 120 by negatively pressurizing the periphery of the reagent cooler 120 will be described.

Since the overall configuration of the automatic analyzer 100 is the same as that of the first embodiment, the description thereof will not be repeated.

A structure of the reagent cooler 120 according to the embodiment will be described using FIG. 9. In the embodiment, a negative pressure chamber 901 and an exhaust unit 902 are provided on the periphery of the reagent cooler 120 instead of the air supply unit 201 according to the first embodiment.

The negative pressure chamber 901 is a chamber that covers the reagent cooler 120 and maintains airtightness with respect to the periphery of the negative pressure chamber 901.

The exhaust unit 902 is a device that exhausts air from the negative pressure chamber 901 and is, for example, a blower fan. By discharging air from the negative pressure chamber 901 using the exhaust unit 902, the inside of the reagent cooler 120 is positively pressurized with respect to the periphery of the reagent cooler 120, that is, a space between the negative pressure chamber 901 and the reagent cooler 120, and the inflow of external air from the periphery of the reagent cooler 120 can be prevented.

As described above, in the embodiment, by discharging air using the exhaust unit 902 from the negative pressure chamber 901 provided on the periphery of the reagent cooler 120, the reagent cooler 120 is positively pressurized with respect to the periphery of reagent cooler 120. Therefore, the inflow of external air into the reagent cooler 120 can be prevented. By preventing the inflow of external air, the inside of the reagent cooler 120 can be kept clean, and the analysis accuracy of the automatic analyzer 100 can be maintained accordingly as in the first embodiment.

Eighth Embodiment

In the first embodiment, the configuration in which the inside of the reagent cooler 120 is kept clean by positively pressurizing the inside of the reagent cooler 120 is described. In order to keep the inside of the reagent cooler 120 clean, it is preferable that the reagent vessel 123 put into the reagent cooler 120 is kept clean. Therefore, in the embodiment, a configuration in which the reagent vessel 123 is cleaned before putting the reagent vessel 123 into the reagent cooler 120 will be described. Since the overall configuration of the automatic analyzer 100 is the same as that of the first embodiment, the description thereof will not be repeated.

A structure of the reagent cooler 120 according to the embodiment will be described using FIG. 10. FIG. 10(a) is a top view showing the reagent cooler 120 according to the embodiment, and FIG. 10(b) is a cross-sectional view taken along a chain line in FIG. 10(a). In FIG. 10(a), the arrangement of the reagent vessel 123 in the reagent cooler 120 can be seen. In addition, in FIG. 10(b), a white arrow indicates the flow of air.

The reagent cooler 120 according to the embodiment includes not only the reagent disk 121, the reagent jacket 122, and the reagent vessel replacement unit 126 but also a removal unit 1001. Since the reagent disk 121, the reagent jacket 122, and the reagent vessel replacement unit 126 have the same structures as those of the first embodiment, the description thereof will not be repeated.

The removal unit 1001 is a device that removes dust or germs attached to the reagent vessel 123 put into the reagent cooler 120 and is, for example, a device that blows air to the reagent vessel 123. The removal unit 1001 is arranged adjacent to the upper stage of the reagent vessel replacement unit 126.

When the new reagent vessel 123 is arranged on the uppermost stage of the reagent vessel replacement unit 126, the removal unit 1001 blows air to the reagent vessel 123 to blow off dust or germs attached to the reagent vessel 123. The dust or germs attached to the reagent vessel 123 are removed by the air blown from the removal unit 1001, and the cleaned reagent vessel 123 is put into the reagent cooler 120 through the reagent vessel replacement unit 126. The sterilization unit 503 described in the third embodiment may be provided instead of the removal unit 1001 or in the front stage of or parallel to the removal unit 1001.

As described above, in the embodiment, the reagent vessel 123 from which dust or germs are removed is put into the reagent cooler 120. Therefore, the inside of the reagent cooler 120 can be kept clean. In addition, by keeping the inside of the reagent cooler 120 clean, the analysis accuracy of the automatic analyzer 100 can be maintained. The air supply unit 201 according to the first embodiment or the negative pressure chamber 901 and the exhaust unit 902 according to the seventh embodiment may be provided in the reagent cooler 120 according to the embodiment to positively pressurize the reagent cooler 120.

The eight embodiments of the automatic analyzer according to the present invention have been described. The automatic analyzer according to the present invention is not limited to the embodiments, and the components can be modified within a range not departing from the scope of the present invention. In addition, a plurality of components disclosed in the embodiments may be appropriately combined. Further, some components may be removed from all the components disclosed in the embodiments.

REFERENCE SIGNS LIST

100: automatic analyzer
101: control unit
102: analysis unit
103: communication line
110: sample transport path
111: sample vessel
112: sample dispensing unit
113: dispensing tip detachment and attachment unit
114: transport unit
115: loading rack
116: dispensing tip
117: reaction vessel
120: reagent cooler
121: reagent disk
122: reagent jacket
123: reagent vessel
123a: lid
124: reagent dispensing unit
124a: dispensing nozzle
125: dispensing hole
126: reagent vessel replacement unit
126a: top plate
126b: bottom plate
130: incubator
140: reaction liquid measurement unit
141: reaction liquid dispensing unit
201: air supply unit
501: temperature control part
502: dehumidification unit
503: sterilization unit
504: filter
901: negative pressure chamber
902: exhaust unit
1001: removal unit

The invention claimed is:

1. An automatic analyzer, comprising:
a reagent cooler, having a lid, that stores a reagent vessel containing a reagent to be reacted with a sample at a predetermined temperature;
a reagent vessel replacement unit that includes an opening in the lid configured to insert the reagent vessel into and remove the reagent vessel out of the reagent cooler, the reagent vessel replacement unit having a top plate and a bottom plate parallel to the top plate spaced apart in a vertical direction to accommodate the insertion of the reagent vessel;
a negative pressure chamber that covers the entire reagent cooler to maintain an airtight chamber, the negative pressure chamber including a blower fan configured to create a negative pressure in the negative pressure chamber thereby positively pressurizing an inside of the reagent cooler with respect to the negative pressure chamber; and
a controller coupled to the reagent vessel replacement unit and the blower fan,
wherein the controller is configured to control the blower fan based on the heights of the top plate and the bottom plate.

2. The automatic analyzer according to claim 1, further comprising:
a reagent dispensing unit that dispenses the reagent from the reagent vessel.

3. The automatic analyzer according to claim 1, further comprising:
a removal unit that is adjacent to the reagent vessel replacement unit and removes dust or germs adhering to the reagent vessel.

4. The automatic analyzer according to claim 1, further comprising:
a dehumidifier, a sterilization device that emits ultraviolet light, a filter, and a heater connected in series that conditions the air blown in by the blower fan.

5. An automatic analyzer, comprising:
a reagent cooler having a circular shape and having a lid, that stores a reagent vessel containing a reagent to be reacted with a sample at a predetermined temperature;
a reagent vessel replacement unit that includes an opening in the lid configured to insert the reagent vessel into and remove the reagent vessel out of the reagent cooler, the reagent vessel replacement unit having a top plate and a bottom plate parallel to the top plate spaced apart in a vertical direction to accommodate the insertion of the reagent vessel, wherein the opening is opened and closed to replace the reagent vessel; and a first blower fan disposed adjacent to and inside of the reagent vessel replacement unit in a radial direction of the reagent cooler configured to blow air onto the reagent vessel;

a negative pressure chamber that covers the entire reagent cooler to maintain an airtight chamber, the negative pressure chamber including a second blower fan configured to create a negative pressure in the negative pressure chamber thereby positively pressurizing an inside of the reagent cooler with respect to the negative pressure chamber; and a controller coupled to the reagent vessel replacement unit and the blower fan, wherein the controller is configured to control the blower fan based on the heights of the top plate and the bottom plate.

6. The automatic analyzer according to claim 5, further comprising:

a reagent dispensing unit that dispenses the reagent from the reagent vessel.

7. The automatic analyzer according to claim 5, further comprising:

a sterilization unit that emits ultraviolet light that sterilizes the air in the reagent cooler.

* * * * *